Dec. 23, 1924.
C. L. BEST
TRACTOR
Filed Jan. 12, 1921
1,520,397
3 Sheets-Sheet 1
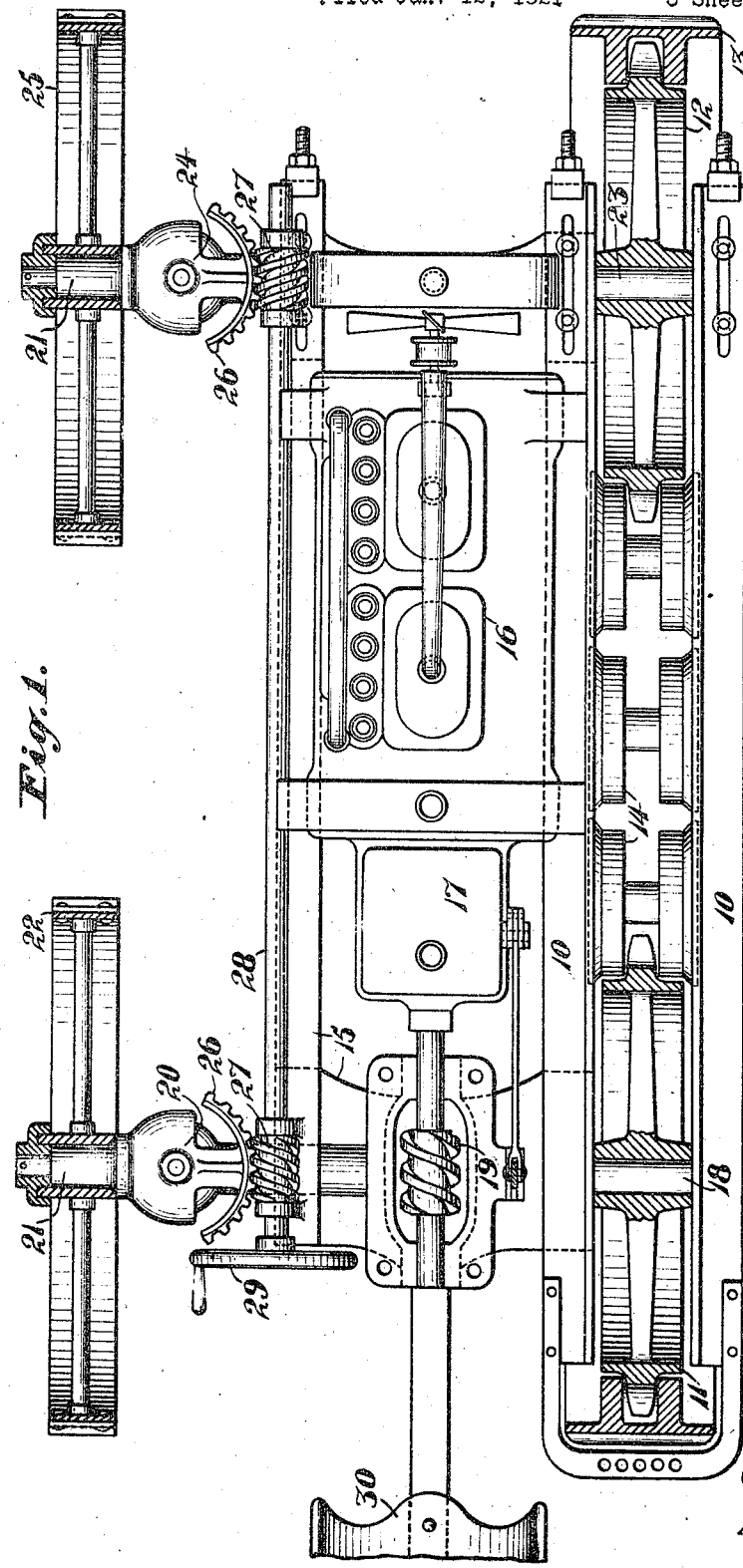
INVENTOR
Clarence L. Best
By
Chas. E. ~~~~~
ATTORNEY

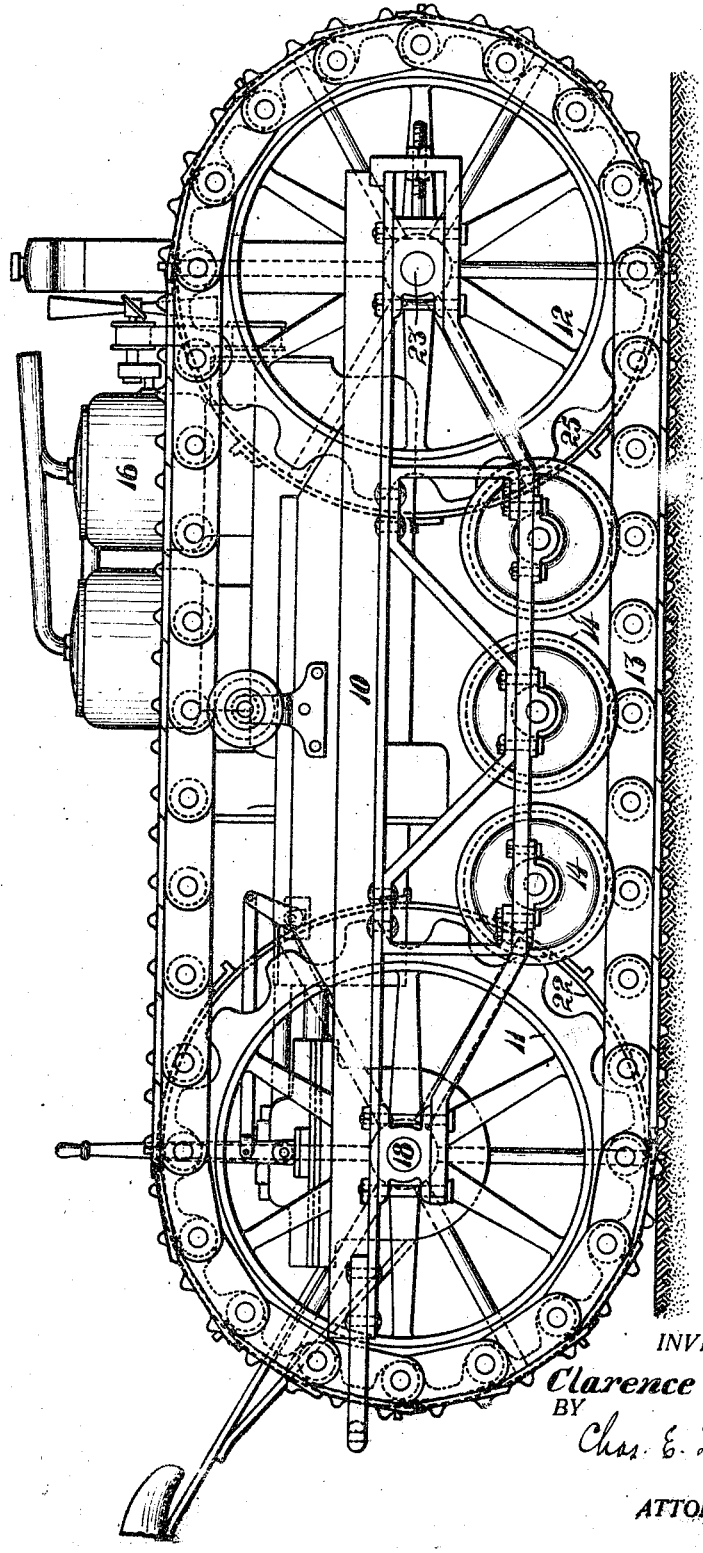

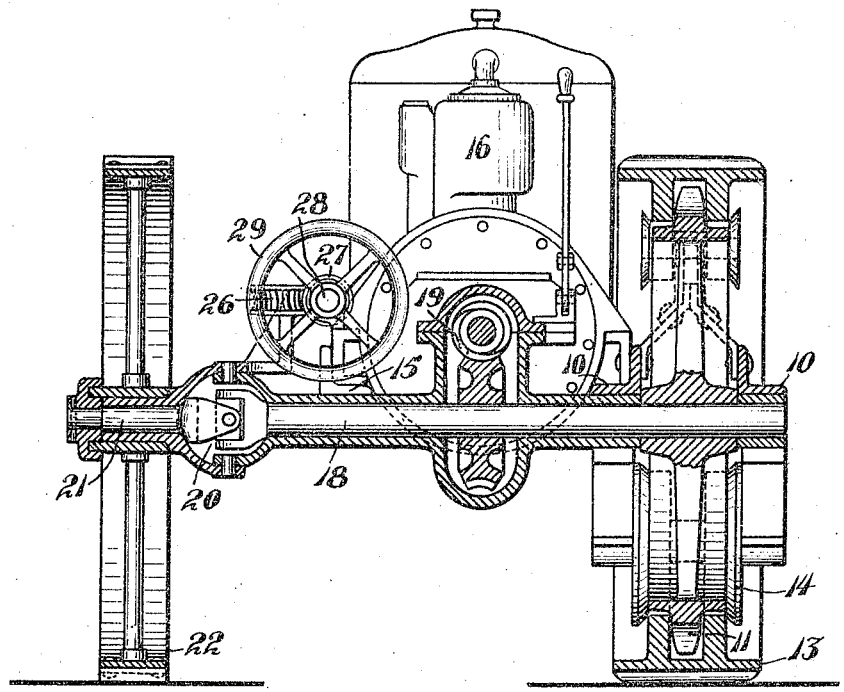

Patented Dec. 23, 1924.

1,520,397

UNITED STATES PATENT OFFICE.

CLARENCE LEO BEST, OF SAN LEANDRO, CALIFORNIA, ASSIGNOR TO THE HOLT MANUFACTURING COMPANY, OF STOCKTON, CALIFORNIA, A CORPORATION OF CALIFORNIA.

TRACTOR.

Application filed January 12, 1921. Serial No. 436,643.

*To all whom it may concern:*

Be it known that I, CLARENCE LEO BEST, a citizen of the United States, residing at San Leandro, in the county of Alameda and State of California, have invented new and useful Improvements in Tractors, of which the following is a specification.

This invention relates to tractors which are essentially of the self-laying track type, and the object of the invention is to produce a simple and compact structure which will be economical in construction and operation.

This object I accomplish by using a single track laying unit which is arranged at one side of a main frame carrying a motor and transmission mechanism operatively connected thereto, and making use of a pair of ground wheels at the opposite side of the main frame for steering the tractor and assisting in supporting and stabilizing the same. The ground wheels are not traction wheels and they carry only a small portion of the weight. They are connected to the main frame by steering knuckles and are turnable simultaneously on their knuckles to cause the tractor to be steered.

One form which my invention may assume is exemplified in the following description and illustrated in the accompanying drawings, in which—

Fig. 1 shows a plan view partly in section of a tractor embodying my invention,

Fig. 2 shows a side elevation of the same, and

Fig. 3 shows a sectional view in elevation taken through the rear axle of the tractor.

I show a track laying unit comprising a truck frame made up of parallel side bars 10 between which at the rear is journalled a driving sprocket wheel 11 and at the front an idler sprocket wheel 12. An endless chain track 13 operates over these sprocket wheels. Between the sprocket wheels the truck frame bows downwardly and receives a series of truck rollers 14 which operate on the ground stretch of the track.

On the inside truck frame bar I connect a main frame 15 which carries a motor 16 and a transmission mechanism 17. The rear sprocket wheel has an axle 18 which is operatively connected to the transmission mechanism by worm gearing 19. This axle extends entirely across the main frame beneath the latter and is connected by a universal joint 20 with a spindle 21 which carries a ground wheel 22. The sprocket wheel 11 is fixed to the axle whereas the ground wheel is turnable freely on the spindle which connects with the axle. The front sprocket wheel has an axle 23 also extending across the main frame and connected at its opposite end by means of a steering knuckle 24 to the spindle of a ground wheel 25.

Each wheel spindle carries a segmental toothed rack 26 meshing with a worm 27 on a longitudinally extending shaft 28. These worms 27 are pitched in opposite directions. The shaft 28 is journalled upon the main frame and carries a hand wheel 29 at its rear end within easy access of a driver's seat 30.

It will be seen that the tractor is driven entirely by the single track at one side and the bulk of the weight is carried by this track unit since the ground wheels are spaced farther from the longitudinal center of the load. To steer the tractor the operator actuates the hand wheel 29 to cause the ground wheels to be cramped so as to swing the track laying unit in the desired direction. The steering connections are such that when it is desired to turn the tractor to the right the front ground wheel will be turned inwardly at its forward portion and the rear ground wheel will be turned outwardly at its forward portion on account of the opposite pitch of the respective worms 27. A left turn of the tractor is accomplished by reversing the direction of the steering shaft.

The present tractor is extremely simple in construction and is quite small and compact and therefore is ideally suited for orchard work and the like. Sufficient weight is imposed upon the single track laying unit to insure adequate traction, and by dispensing with a second track considerable expense is saved in the matter of initial cost and upkeep.

Various changes in the construction and arrangement of the several parts herein shown and described may be employed without departing from the spirit of my invention as disclosed in the appended claims.

Having thus described my invention, what I claim and desire to secure by Letters Patent is—

1. A tractor comprising a main frame, a track unit at one side thereof comprising a rear driving sprocket wheel, a front idler sprocket wheel, an endless flexible track encompassing said sprocket wheels, axles for said sprocket wheels extending transversely of the main frame and a ground wheel journalled on the opposite end of each of said axles.

2. A tractor comprising a main frame, a track unit at one side thereof comprising a rear driving sprocket wheel, a front idler sprocket wheel, axles for said sprocket wheels extending transversely of the main frame, a ground wheel journalled on the opposite end of each of said axles and a swivel connection between the spindle of each ground wheel and the axle whereby to steer the tractor.

3. In a track-laying tractor, the combination of a single track-laying unit, including a frame, a driving sprocket wheel at the rear of the frame, an idler wheel at the front of the frame, axles for said sprocket and idler wheels, a power-supporting frame secured to one side of the track-laying frame, and balancing and steering wheels arranged at the other side of the power-supporting frame and carried by said axles.

4. In a track-laying tractor, the combination of a single track-laying unit, including a frame, a driving sprocket wheel at the rear of the frame, an idler wheel at the front of the frame, axles for said sprocket and idler wheels, a power-supporting frame secured to one side of the track-laying frame, balancing and steering wheels arranged at the other side of the power-supporting frame and carried by said axles, and driving connections for the axle, on which the sprocket wheel is mounted.

CLARENCE LEO BEST.